United States Patent [19]
Spicer

[11] 3,790,094
[45] Feb. 5, 1974

[54] MOBILE LEAF PULVERIZER
[76] Inventor: John J. Spicer, 43872 Shearer Dr., Plymouth, Mich. 48170
[22] Filed: Mar. 22, 1972
[21] Appl. No.: 236,820

[52] U.S. Cl. ............... 241/101.1, 56/13.3, 56/16.9, 241/101.7
[51] Int. Cl. .......................................... B02c 18/12
[58] Field of Search ....... 241/47, 49, 50, 51, 53, 55, 241/86, 101.1, 101, 7; 56/25.4, 13.3, 16.9

[56] References Cited
UNITED STATES PATENTS
2,809,488  10/1957  Sewell .................................. 56/25.4
3,058,284  10/1962  Anderson ............................. 56/25.4
3,716,089  2/1973   Bateman .......................... 56/12.8 X Primary Examiner—Roy Lake
Assistant Examiner—E. F. Desmond
Attorney, Agent, or Firm—Charles W. Chandler

[57] ABSTRACT

A mobile leaf pulverizing apparatus having a pick-up blade in an open-bottomed housing. The pick-up blade is rotated parallel to and above the ground to provide an upward air current that removes leaves and the like from the ground. The leaves pass through the pick-up housing to a cylindrical pulverizer having a rotary cutter. Although the pulverizer housing has a plurality of openings for passing the air received from the pick-up housing, certain of the openings are formed to prevent the passage of leaf particles except through the remainder of the openings. The pulverizer can be disconnected from the pick-up housing when the leaves are to be only transferred from one ground area to another.

11 Claims, 8 Drawing Figures

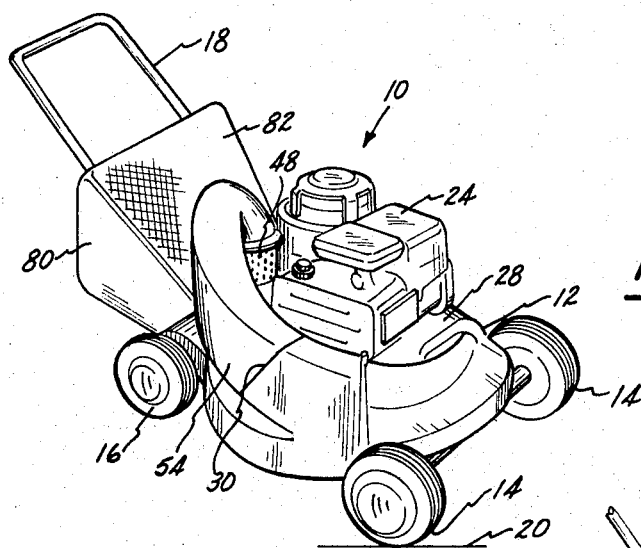
Fig-1
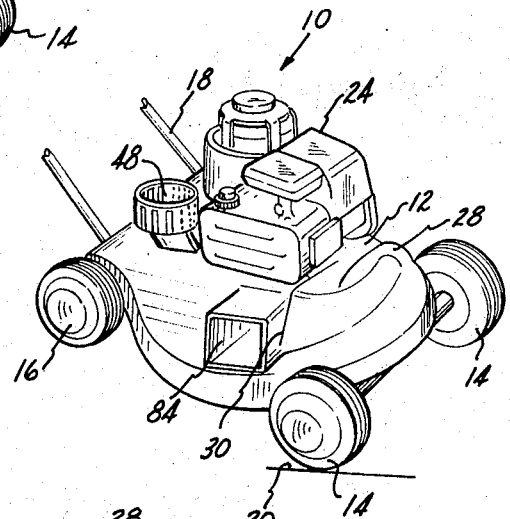
Fig-2
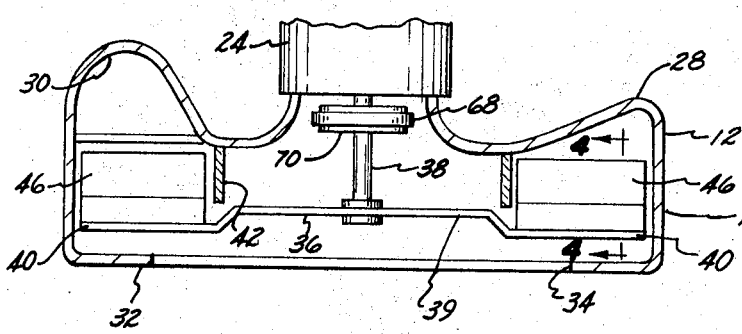
Fig-3
Fig-4

MOBILE LEAF PULVERIZER

BACKGROUND OF THE INVENTION

This invention relates to a mobile leaf collecting and pulverizing device having a blade that is rotated substantially parallel to the ground for removing leaves from the ground and passing them to a pulverizer and then to a container.

Mobile leaf collecting devices of the prior art such as disclosed in U.S. Pat. No. 2,661,584 to J. A. Ronning and U.S. Pat. No. 2,669,078 to H. G. Gregory, employ a powered rotary rake or brush which engages the leaves to remove them from the ground. The leaves then are pulverized and then either collected in a suitable container or redistributed on the ground. Such devices are usually difficult for the user to operate because of the power necessary to drive the rake through the grass.

SUMMARY OF THE INVENTION

One of the purposes of the present invention is to provide a mobile leaf device having a powered blade that is rotated parallel to the ground above the grass to provide a current of air for removing the leaves from the ground. Another purpose of the present invention is to provide a novel device for pulverizing the leaves as they are being passed through a housing by air motion. The pulverizer housing has several openings for passing air, but certain of the openings prevent the passage of leaf particles with the air.

One of the advantages of the present invention is that it obviates the necessity for a raking device for removing the leaves from the grass. By employing an air current for moving the leaves from the ground to the collection bag, the pulverizer can be incorporated in a compact, lightweight, housing.

Furthermore, the preferred mobile leaf pulverizing apparatus can be converted to a device for only cleaning debris form the user's lawn without the pulverizing function by removing a duct connecting the pick-up housing to the pulverizer housing, and connecting an appropriate outlet duct. The user can also remove the pick-up blade and mount a conventional grass-cutting blade to convert the device to a lawnmower.

Still further objects and advantages of the invention will become apparent to those skilled in the art upon reference to the following detailed description.

DESCRIPTION OF THE DRAWINGS

The description refers to the accompanying drawings in which like reference characters refer to like parts throughout the several views and in which:

FIG. 1 is a perspective view of a mobile leaf pulverizer illustrating the preferred embodiment of my invention;

FIG. 2 is a view of the preferred apparatus with the outlet of the pick-up housing being disconnected from the pulverizer;

FIG. 3 is a sectional view through the pick-up housing;

FIG. 4 is an enlarged view of one of the pick-up blades as seen along lines 4—4 of FIG. 3;

DESCRIPTION OF THE PREFERRED EMBODIMENT

Figure 5:
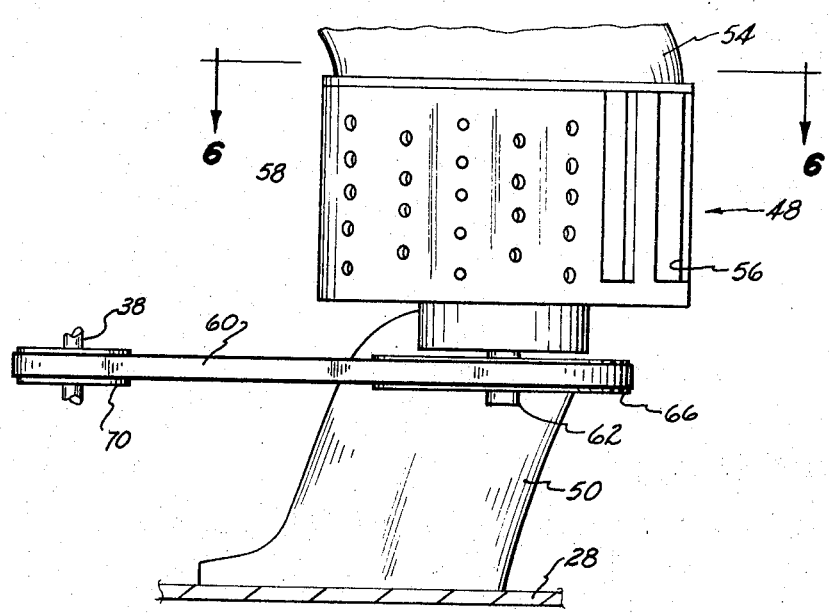
FIG. 5 is an enlarged fragmentary elevational view of the preferred pulverizer.

Referring to the drawings, a preferred mobile leaf pulverizing apparatus 10 is illustrated in FIG. 1. Apparatus 10 includes a pick-up housing 12 mounted on a pair of forward wheels 14 and a pair of rearward wheels 16. A "U"-shaped handle 18 has its lower ends connected to housing 12 for moving apparatus 10 across ground 20. A conventional internal combustion engine 24 is mounted on housing 12.

As best shown in FIGS. 1 and 3, housing 12 has an annular side wall 26. A top wall 28, carried by side wall 26, supports engine 24. Wall 28 has a top opening 30 adjacent side wall 26. Top wall 28 slopes downwardly along side wall 26 from the upper side of outlet opening 30 to its lower side.

An annular lip 32 is connected to the bottom edge of side wall 26 to define a bottom inlet opening 34 beneath engine 24. For illustrative purposes, lip 32 has a width of about 1½ inches and an outer diameter of about 22 inches. Lip 32 provides a safety shield adjacent opening 34 and also prevents leaves from dropping out of housing 12.

An elongated pick-up blade 36 is rotatably carried on a driven output shaft 38 of engine 24. Pick-up blade 36 has a generally flat midsection 39 and a pair of similarly formed ends 40. Blade midsection 39 is rotatable adjacent an annular wall 42. Each blade end 40 is bent downwardly adjacent wall 42 then bent so as to be supported in a horizontal position when housing 12 is disposed with bottom opening 34 adjacent ground 20.

Referring to FIG. 4, the leading edge of each blade end 40 is bevelled at 44, while the rearward edge is bent upwardly at an angle of about 45° with respect to the body of the blade. A short flat metal vane 46 is connected to the rearward edge of each blade end. The upper edge of each vane 46 is carried in a path of rotation between side wall 26 and annular wall 42.

When a blade end 40 is adjacent outlet opening 30, its vane 46 is closely adjacent top wall 28, as best shown in FIG. 3. As the pick-up blade is rotated by engine 24, the distance between each vane 46 and top wall 28 gradually increases until the vane passes outlet opening 30. The rotation of pick-up blade 36 is such that leaves and the like disposed on ground 22 are picked up by an artificial current of air and received through bottom opening 34. The leaves then pass upwardly through the housing toward top opening 30. Preferrably the height of housing 26 above the ground can be adjusted to optimize the air current.

Referring to FIGS. 1 and 5, pulverizer means 48 are mounted on bracket means 50 behind engine 24. Pulverizer means 48 has a pulverizer housing 52. A duct 54 connects outlet opening 30 of the pick-up housing to the top of the pulverizer housing. Duct 54 is preferably removable from the pick-up housing.

Figure 6:
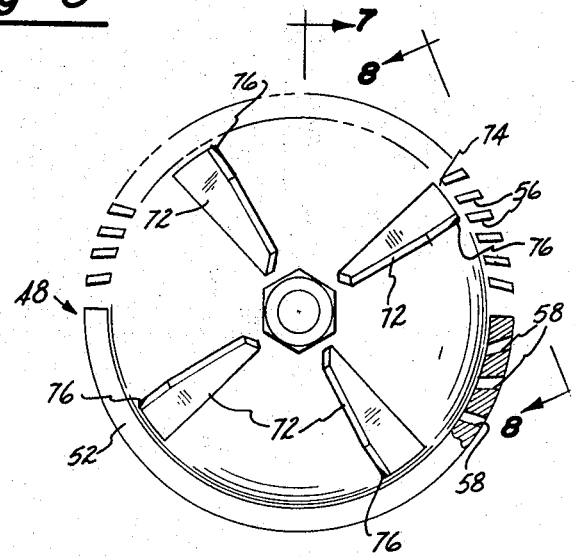
FIG. 6 is a view as seen along lines 6—6 of FIG. 5.
Figure 8:
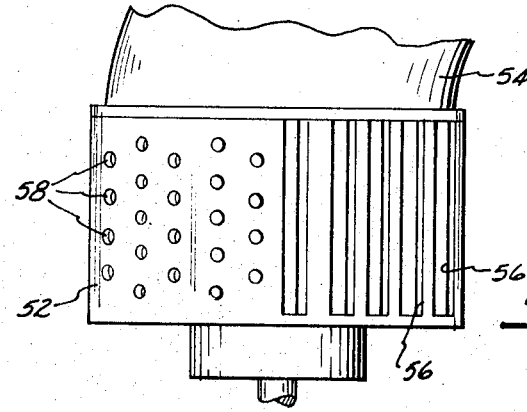
FIG. 8 is a view as seen along lines 8—8 of FIG. 6.

Referring to FIG. 6, pulverizer housing 52 has a cylindrical wall with a series of parallel, slots 56 formed about an arc of 180°. Each slot 56 extends substantially the full height of the cylindrical wall with the opposite sides of each slot being so formed that air being discharged from the housing passes through the housing wall in a direction having a component that is tangential to the housing wall.

The other half of the pulverizer wall has a plurality of generally circular openings 58. Openings 58 are each formed such that air being discharged through the openings from the interior of the pulverizer housing, passes through the housing wall in a direction also having a component that is tangential to the housing wall, but in the opposite direction with respect to the tangential component of air passing through slots 56.

Figure 7:
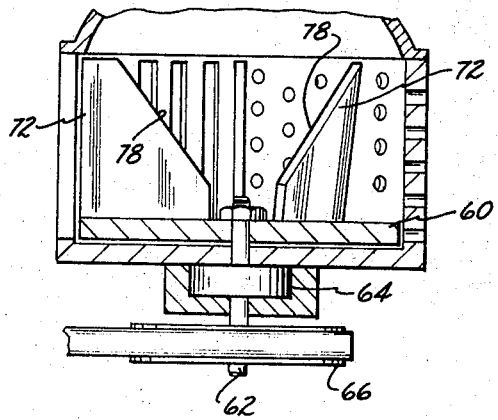
FIG. 7 is a view as seen along lines 7—7 of FIG. 6.

Referring to FIGS. 5 and 7, a rotatable support 60 is mounted adjacent the base of pulverizer housing 52. Support 60 is carried on shaft 62 which is supported by bearing means 64 mounted on housing 52. A sheath 66 is carried on shaft 62 and is connected by a drive belt 68 to a sheath 70 carried by engine shaft 38.

Four similarly shaped cutter blades 72 are carried on support 60, as best shown in FIGS. 6 and 7. Each cutter blade 72 has a cutting edge 74 adjacent the pulverizer housing wall. Referring to FIG. 6, assuming the cutter blades are rotated in a clockwise direction, each blade is inclined from its base to its top edge in its direction of rotation. The leading side of each blade adjacent its cutting edge is slightly narrowed as at 76 to assist the cutting action as the leaves pass through slots 56. The inner edge 78 of each cutter blade is formed at an angle of about 45° with respect to the cutter blades axis of rotation, as best shown in FIG. 7.

Leaves being received in the pulverizer housing from duct 54 pass through the top of the pulverizer housing in a direction generally parallel to the axis of rotation of cutter blades 72. The air passing through the pulverizer housing is discharged through both outlet slots 56 as well as outlet openings 58. However, the air passing through outlet slots 56, is discharged in a direction having a tangential component that is in the direction of rotation of blades 76, while the air passing through outlet openings 58 is discharged in a direction that is opposite to the rotation of blades 76. Consequently, the leaf particles being discharged from the pulverizer housing tend to pass outwardly only through slots 56 and not through openings 58. This arrangement for discharging the leaf particles provides several special advantages. For example, the pulverizer housing can be mounted closely adjacent engine 24 without the leaf particles being discharged on the engine. Referring to FIG. 1, a container 80 is removably mounted on handle 20, with an inlet being connected to the pulverizer housing to receive pulverized leaves being discharged through outlet slots 56. Preferably the top wall 82 of container 80 is formed of a mesh that allows the air which carries the leaves to pass upwardly while the pulverized leaves remain in the container.

In operation, the user energizes engine 24 in a conventional manner to drivingly rotate shaft 38 which in turn rotates both pick-up blade 36 as well as cutter blades 72. Pick-up blade 36 moves in a path parallel to ground 20 to develop a substantial air current through inlet opening 34 toward outlet opening 30. The current of air removes leaves and other debris from the ground without the pick-up blade engaging the grass, as is necessary for powered rakes and the like. The leaves pass through both the pick-up housing and duct 54 into pulverizer means 48. The leaves then pass through slots 56 while being pulverized into very fine particles by cutter blades 72.

FIG. 2 shows an alternative method for discharging leaves or other material being picked up from the ground by the pick-up housing. For this mode of operation, the user removes duct 54 and mounts a discharge duct 84 on outlet opening 30 to deliver the material being picked up in a lateral direction with respect to the motion of the pulverizing apparatus 10 over the ground.

Apparatus 10 can be modified to form a lawnmower by replacing blade 36 with a blade appropriate for cutting grass and discharging the cut grass from the pick-up housing into an appropriate container rather than into the pulverizer means. It is to be noted that cutter blades 72 not only function to pulverize the leaves, but their rotation assists the passage of air through the pick-up housing.

Having described my invention, I claim:

1. Mobile apparatus, comprising:
   a mobile pick-up housing having ground-engaging wheels, and an annular side wall, a top wall connected to the side wall with a top outlet opening, and an annular lip providing a planar surface parallel to the path of motion of the blade, and being connected to the side wall below the top wall to define a bottom inlet opening;
   an elongated blade mounted in the housing, one end of the blade being rotatable between the top wall and the annular lip in a path of motion substantially parallel to the ground; and
   power means mounted on the frame and connected to the blade for powered rotation, whereby air is received through the inlet opening defined by the lip and passed through the outlet opening as the blade is being rotated in the housing.

2. Mobile apparatus as defined in claim 1, in which the top outlet opening is adjacent the side wall, and the distance between the top wall and the blade increases as the blade is being rotated along its path of motion.

3. Mobile apparatus as defined in claim 1, including an annular inner wall mounted in the pick-up housing above the path of rotation of the blade and having a diameter less than that of the annular side wall, and a vane carried on the end of the blade between the side wall and the inner wall, the vane being disposed to pass adjacent the outlet opening as the blade is being rotated.

4. Mobile apparatus as defined in claim 3, in which the end of the blade has a leading edge substantially parallel to the path of motion of the blade, and the vane is disposed at an angle about 45° with respect to said leading edge.

5. Mobile leaf pulverizing apparatus, comprising:
   a mobile pick-up housing having wheels for engaging the ground, an inlet opening supported adjacent the ground and an outlet;
   a pick-up blade mounted in the pick-up housing, and power means connected to the pick-up blade for passing air through the inlet opening as the pick-up blade is being rotated;
   a cutter blade mounted on said pick-up housing and being connected to the power means for powered rotation;
   a pulverizer housing enclosing the cutter blade and being connected to the outlet of the pick-up housing to receive air therefrom, and
   the pulverizer housing having a cylindrical wall adjacent the path of rotation of the blade, said wall having a first opening and a second opening for passing air received into the housing, the first opening being shaped such that air passing through the first opening has a component of motion tangential to the path of rotation of the cutter blade end and in the direction of blade motion, and the second opening being shaped such that air passing through the second opening has a component of motion tangential to the path of rotation of the cutter blade and opposite to the direction of blade motion, whereby leaves being received with the air passing through the inlet opening of the pick-up housing are pulverized as the cutter blade is being rotated and discharged from the pulverizer housing only through the first opening.

6. Mobile leaf pulverizing apparatus as defined in claim 5 in which the first opening of the pulverizer housing is elongated and substantially parallel to the axis of rotation of the pulverizer blade.

7. Mobile leaf pulverizing apparatus as defined in claim 5, including a plurality of openings similar to the first opening disposed about a circumferential portion of the pulverizer housing wall, and a plurality of openings similar to the second opening disposed about the remainder of the pulverizer housing wall.

8. Mobile leaf pulverizing apparatus as defined in claim 5, in which the second opening has a generally circular cross-section.

9. Mobile leaf pulverizing g apparatus as defined in claim 5, including a container disposed to receive and leaves being passed through the first opening.

10. Mobile apparatus, useful for pulverizing leaves disposed on the ground, comprising:

a pick-up housing having ground engaging wheels, an annular side wall, a top wall connected to the side wall with a top outlet opening, and an annular lip connected to the side wall below the top wall to define a bottom inlet opening;

a pick-up blade mounted in the pick-up housing for rotation along a path between the top wall and the lip;

a cutter blade mounted on the pick-up housing for rotation about an axis;

a pulverizer housing enclosing the cutter blade, and connected to the outlet of the pick-up housing for receiving leaves there from, the pulverizer housing having a wall with a plurality of openings disposed adjacent the path of the rotation of the cutter blade for passing air received in the pulverizer housing, the openings being so formed that leaves being received in the pulverizer housing and passed through the pulverizer housing wall as the cutter blade is being rotated adjacent certain of said openings but not the remainder of said openings; and power means connected to the pick-up blade to rotate it whereby leaves on the ground are moved through the inlet of the pick-up housing and delivered to the pulverizer housing to be pulverized as the cutter blade is being rotated.

11. A mobile apparatus as defined in claim 1, in which the annular lip has a width greater than one inch.

* * * * *